(No Model.) 4 Sheets—Sheet 1.
C. W. BILDT.
FEED DEVICE FOR GAS PRODUCERS.
No. 498,229. Patented May 30, 1893.
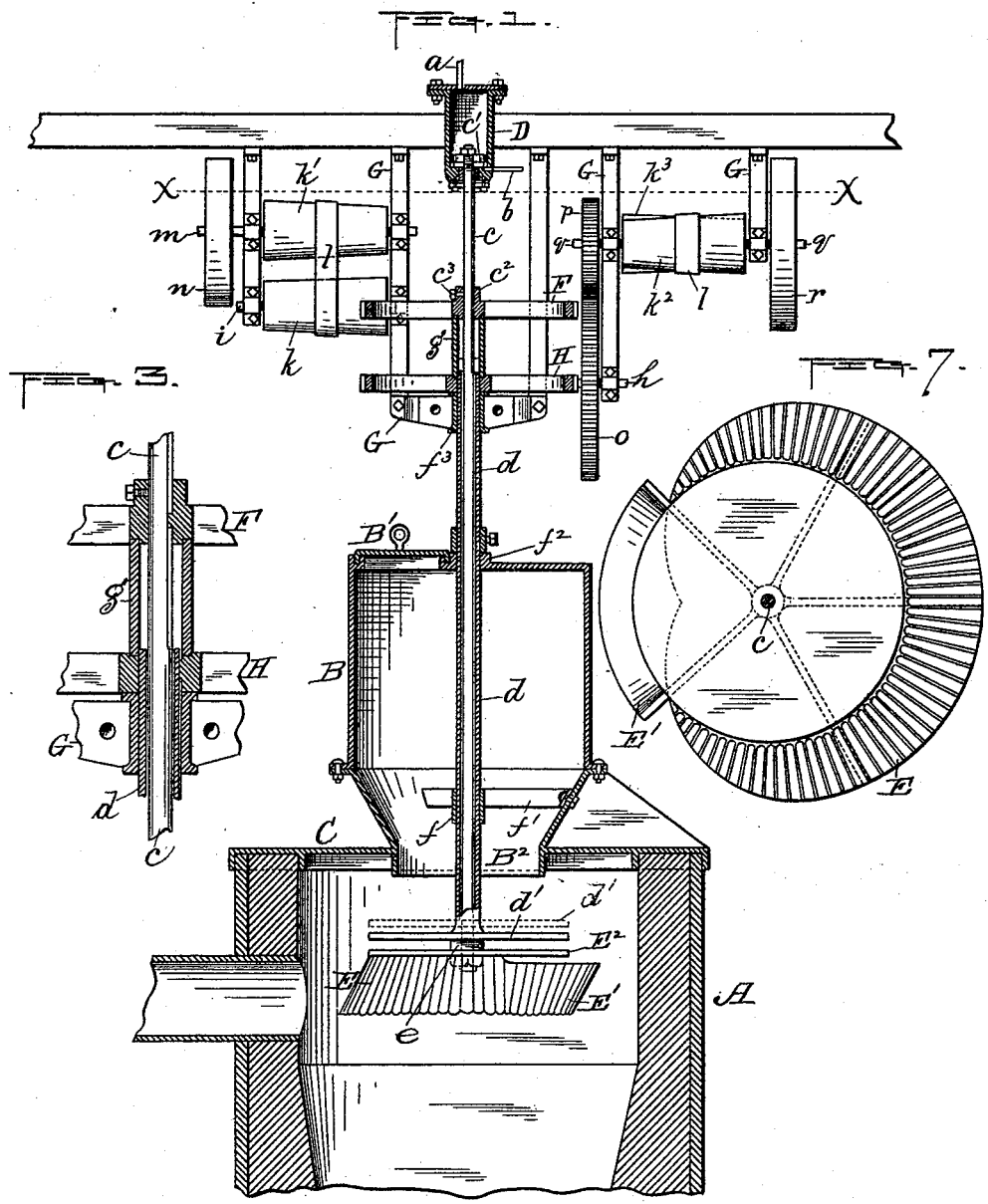
Witnesses:
W. B. Nourse.
C. Forrest Nisson.
Inventor:
Carl Wilhelm Bildt.
By A. A. Barker, Att'y.
THE NORRIS PETERS CO., PHOTO-LITHO., WASHINGTON, D. C.

(No Model.) 4 Sheets—Sheet 2.
C. W. BILDT.
FEED DEVICE FOR GAS PRODUCERS.
No. 498,229. Patented May 30, 1893.
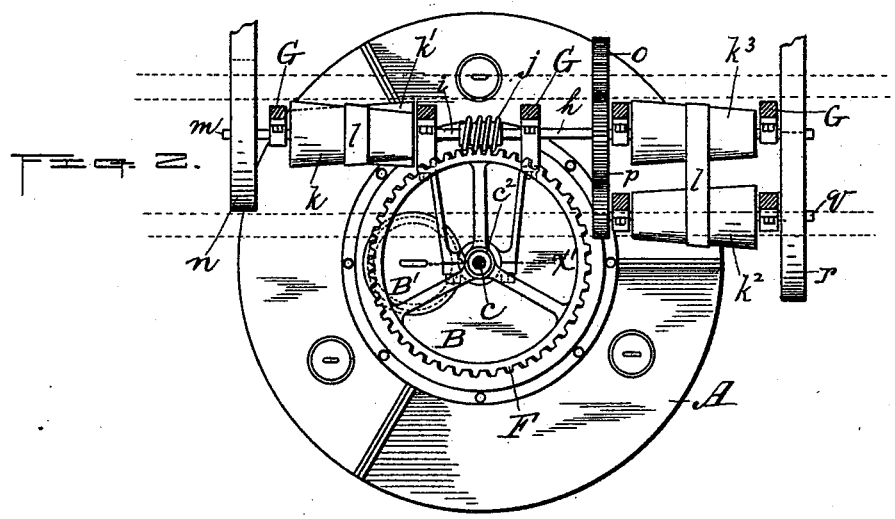
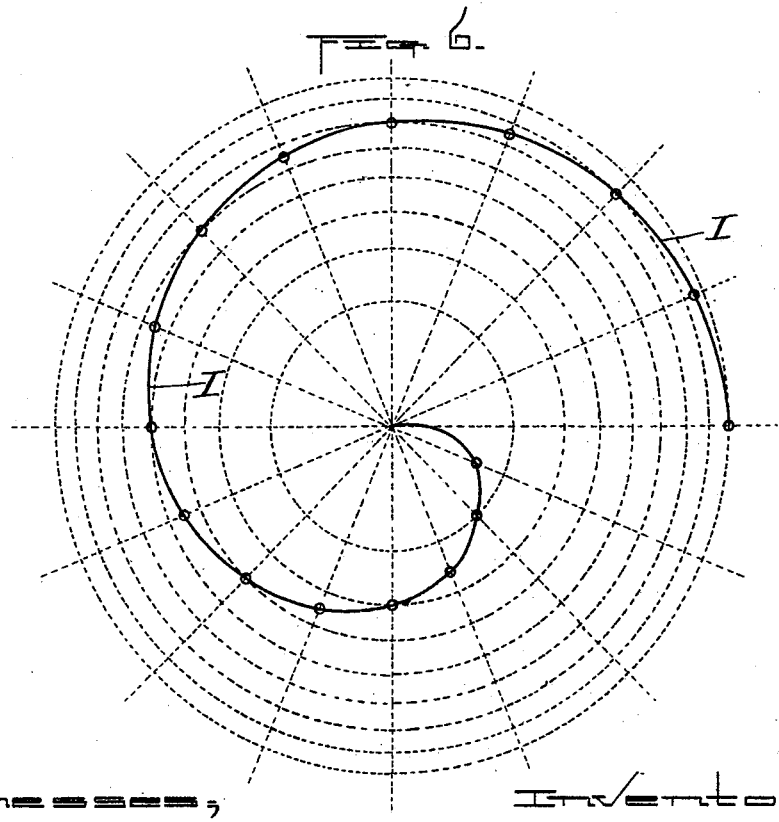
Witnesses:
W. B. Nourse.
C. Forrest Wesson.
Inventor:
Carl Wilhelm Bildt.
By A. A. Barker Att'y (No Model.) 4 Sheets—Sheet 3.

C. W. BILDT.
FEED DEVICE FOR GAS PRODUCERS.

No. 498,229. Patented May 30, 1893.

Witnesses:
W. B. Nourse.
C. Forrest Nisson.

Inventor:
Carl Wilhelm Bildt.
By A. A. Barker, Att'y.

THE NORRIS PETERS CO., PHOTO-LITHO., WASHINGTON, D. C.

(No Model.) 4 Sheets—Sheet 4.

C. W. BILDT.
FEED DEVICE FOR GAS PRODUCERS.

No. 498,229. Patented May 30, 1893.

Witnesses:
W. B. Nourse.
C. Forrest Nesson.

Inventor:
Carl Wilhelm Bildt.
By A. A. Barker Att'y.

UNITED STATES PATENT OFFICE.

CARL WILHELM BILDT, OF WORCESTER, MASSACHUSETTS.

FEED DEVICE FOR GAS-PRODUCERS.

SPECIFICATION forming part of Letters Patent No. 498,229, dated May 30, 1893.

Application filed September 17, 1892. Serial No. 446,209. (No model.)

*To all whom it may concern:*

Be it known that I, CARL WILHELM BILDT, of the city and county of Worcester, and State of Massachusetts, have invented certain new and useful Improvements in Feed Devices for Gas-Producers; and I do hereby declare that the following is a full, clear, and exact description thereof, reference being had to the accompanying drawings, forming a part of this specification, and in which—

Figure 4:
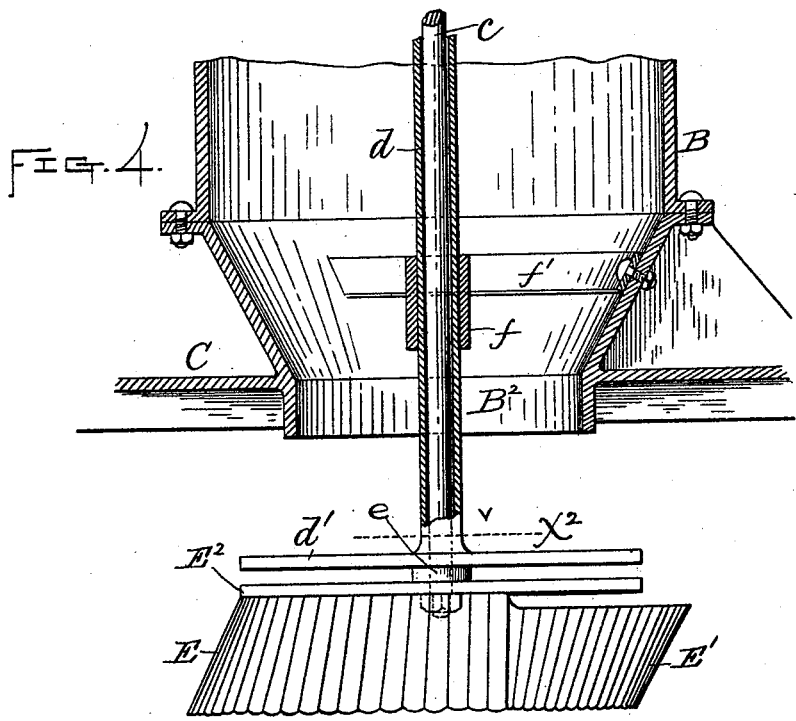
Figure 5:
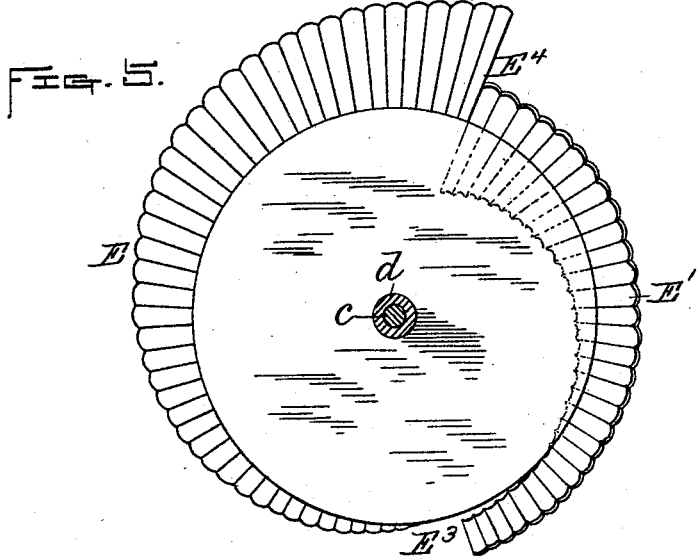

Figure 1 represents a vertical section through the upper part of a gas producer and my improved feed device applied thereto, with portions of said device shown in elevation. Fig. 2 is a horizontal section through the upper part of the device taken on line $x\ x$, Fig. 1, looking down and showing a plan of the parts coming below said section line. Figs. 3 and 4 are enlarged vertical sections of parts of the device hereinafter described, taken at the point indicated by line $x'$, Fig. 2. Fig. 5 is a horizontal section upon the same enlarged scale, taken on line $x^2$ Fig. 4, showing a plan of the coal-distributing part of the device. Fig. 6 represents a geometrically constructed spiral line showing the line of distribution of the coal by the distributer of my device, which will be hereinafter more fully described, and Figs. 7, 8, 9 and 10 show modifications in the construction of the coal distributer, which will be hereinafter described.

The object of my invention is to effect a saving in fuel and labor, and also to reduce the liability of injury to the workmen from escaping gas.

It relates more particularly to improvements upon my patented invention for a like purpose, dated December 16, 1890, and numbered 442,676; and consists of a feed device or apparatus, combined with the top of the gas producer, having a continuously rotating disk for regulating the feed or supply of coal, and a continuously rotating disk or frame provided with a fan-shaped blade or blades for evenly distributing said coal in the producer, each run independently, as and for the purpose hereinafter more fully set forth.

In order that others skilled in the art to which my invention appertains may better understand the nature and purpose thereof, I will now proceed to describe it more in detail.

As is well known, the more uniform the layer of coal is kept in a gas producer, the better will be the result obtained, owing to the more even and uniform combustion thereby produced.

Prior to my inventions, a common way of running gas-producers has been to charge the coal by hand through a hopper. By this method the coal is not evenly distributed over the surface of the fire, but falls more in one place than another, thus forming layers which increase in thickness in different places as the coal is continued to be poured in. A variation in the composition of the gas is thereby produced in the generator in different parts of the same producer, which also results in the production of an excess of carbonic acid, and other non-combustible gases and therefore results in a waste of coal. Another objection to charging by hand, aside from the waste of coal, is the escape of gas which is very injurious to the workmen.

All of the above objections I have found by practical demonstration are wholly removed by my invention.

Referring to the drawings, the part marked A represents the upper part of an ordinary gas-producer, which, being of well known construction, requires no detailed description, my invention, as before stated, relating only to the means employed for supplying the coal thereto.

B is the coal receptacle which is fastened centrally over the producer, to the cover C, or otherwise as may be required in practice. It is provided at the top with a supply opening and cover B', and at the bottom converges to a discharge opening $B^2$, somewhat smaller than the transverse diameter of the receptacle.

Centrally above the producer and its coal receptacle is arranged a hydraulic cylinder D provided with the usual water pipes $a$ and $b$ at the ends, and within said cylinder is fitted the piston head $c'$ of the rod or spindle $c$ which extends down into the generating chamber of the producer, and has mounted on its lower end the coal distributing, fan-shaped blades, E E', which will be hereinafter described. Said rod or spindle is operated vertically by the hydraulic mechanism above described, and is turned by a horizontal worm gear F, fastened to the rod so that they will turn together and at the same time permit the rod to slide vertically in the hub of said gear. Over said rod is fitted a hollow shaft or sleeve $d$ which also extends down into the producer, and has mounted on its lower end a horizontal disk $d'$, which rests and turns with its sleeve on a central collar or hub $e$ at the foot of rod $c$. Said sleeve and disk are free to move up and down with the rod and its coal-distributing blades. The lower end of the sleeve is guided by and slides in a suitable bearing $f$ mounted on an arm or brace $f'$, fastened in this instance to the coal receptacle B; it also slides in a bearing $f^2$ in the top of said receptacle, and at its upper end in a bearing $f^3$ of the supporting frame G, as well as in the hub of a horizontal worm-gear H, which is splined to the sleeve, so that the latter, while being permitted to slide therein as aforesaid, is also turned by the gear. Outside of both the rod $c$ and sleeve $d$ between the two horizontal gears F H, is arranged a short, stationary sleeve $g$ in which the upper end of the sleeve $d$ also slides vertically when the rod is raised or lowered. The sleeve $d$ it will be understood is supported by said rod. It may be fitted loose on the rod so that its disk may rest on the hub $e$ of the distributer; or, if desired, it may be suspended when in use so as to hold the disk a little above and out of contact with said hub $e$, by means of a collar and screw above the collar $f^2$ as is shown in Fig. 1; or in any other well known way.

The purpose of the foregoing construction is to impart independent, continuous, rotary movements to the disk $d'$ and to the coal-distributing blades E E',—the former being turned slowly to properly feed the coal from the bottom of the receptacle B, and the latter more rapidly to properly distribute said coal as it is discharged onto the blades from said disk. Said blades are preferably corrugated in a vertical direction as is shown in the drawings, to facilitate the proper discharge of the coal, and one blade is made to flare or diverge spirally, while the other converges spirally, the curve of one commencing where the other leaves off at their adjacent ends. Therefore as the coal is discharged thereon, it is distributed therefrom in continuous spiral lines I (see Fig. 6) from the outside to the center of the surface to be distributed upon, and consequently an even, uniform layer of coal is deposited over the whole of said surface,—the advantage of which will at once be apparent to those skilled in the art to which my invention belongs. The distributing blades are fastened to a suitable horizontal disk or frame $E^2$, which is in turn secured to the lower end of the rod $c$.

The shape, or number of the blades is not essential, so long as the above principle is carried out. Various similar shapes, and one or more blades may be used with substantially the same result.

The construction shown in Fig. 5 and the previous figures of the drawings represent the blades made of similar shapes, except that they are reversed, or, in other words, one is convex and the other is concave in shape,— each commencing at one end $E^3$ in a nearly vertical line and flaring outward toward its other end $E^4$, as is fully shown in Figs. 4 and 5 of the drawings.

In Fig. 7, I have shown the construction adopted in my former patented invention previously referred to which shows the flaring blade E as occupying about three-fourths and the converging blade E' the remaining fourth of the circumference of the plate or disk which supports the same, the ends of the blade E being made nearly vertical and narrow next to the blade E' and widening and flaring outward to the center opposite from said blade E'. Substantially the same result is produced by both shapes of distributing blades, and I therefore reserve the right to use either or any shape suitable for the purpose.

Figure 8:
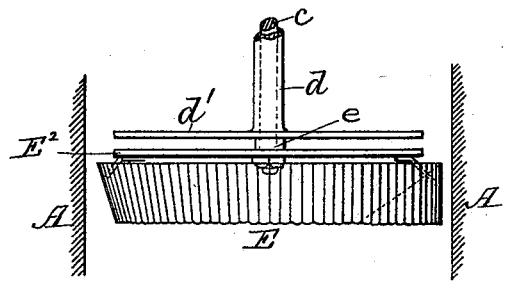
Figure 9:
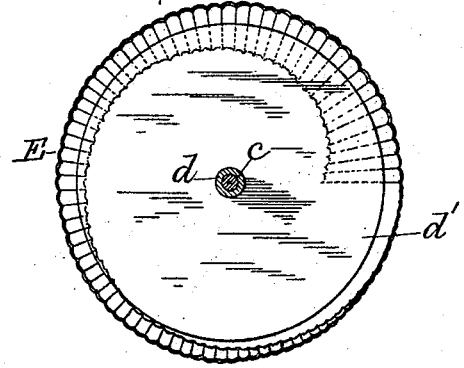
Figure 10:
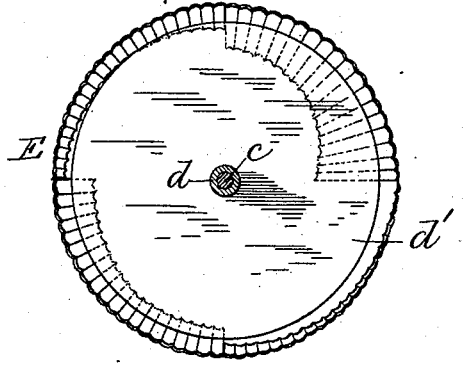

In Figs. 8 and 9 I have shown a side view and plan respectively, of a distributer made with one blade, while in Fig. 10 a plan of a distributer with four blades is shown. By either construction the coal would be evenly distributed over the whole surface of the fire, in substantially the same way, the only difference between one distributer and another of different shape or number of blades being in the line of discharge therefrom, either in a continuous, spiral line as shown by the line I in Fig. 6, or in irregular lines as would necessarily be the case by the use of several irregularly arranged slanted blades, as is shown in Fig. 10. The same total slanting discharging surface would be maintained by the last construction as by the former, but being irregularly disposed would discharge the coal in like manner as aforesaid. The distribution over the surface would be as uniform by one method as by the other, but for obvious reasons the constructions shown in Figs. 1, 4, 5 and 7 are preferred. By the use of a single blade such as shown in Figs. 8 and 9, it would be necessary, in order to cover the whole surface of the fire, to make the distributer and disk $d'$ nearly as large as the diameter of the combustion chamber, on account of the shape of the blade which commences in a vertical line at a given point, and slants gradually inward to the widest point in plan view, next to said vertical point, as is shown in Fig. 9.

For producers of small size a single blade might be used advantageously, but for the larger sizes, two or more blades, flaring both outward and inward, and thus admitting of the distributer being made of smaller diameter, are preferable.

The amount of coal discharged from the receptacle is regulated by changing the speed of the disk $d'$, or by raising or lowering said disk $d'$ to decrease or increase the space between the top thereof and the bottom of said coal receptacle, which is done by raising or lowering the rod $c$ that supports the same, in like manner to raising and lowering other hydraulic piston rods, and thus requires no special description. In thus regulating the distance for the feed, the collar $c^2$ on rod $c$ is first loosened by unscrewing its set screw $c^3$ and the rod raised or lowered as required, and then said set-screw is turned up again to hold the parts in their newly adjusted positions.

The mechanism for driving the gears F, H may be arranged and constructed in various ways, and I therefore do not limit myself to any special construction.

The driving mechanism shown in the drawings is constructed and arranged as follows:— Upon horizontal drive-shafts $h$ $i$ fitted to turn in suitable bearings in frame G are secured worm-wheels $j$ (only one of which is shown in Fig. 2 of the drawings, the other coming directly under the same), which engage with gears F H. A cone-pulley $k$ is also secured on the outer end of the horizontal shaft $i$ which is connected by a suitable belt $l$ with a similar cone-pulley $k'$, on horizontal shaft $m$ which is fitted to turn in suitable bearings in frame G, and is operated by the pulley $n$ on its outer end. The shaft $h$ is driven in a similar manner to shaft $i$ except that the gears $o$ $p$ are interposed between said shaft and the cone-pulleys $k^2$ $k^3$,—the larger of the two gears $o$ being secured to shaft $h$ and the other $p$ (which meshes with gear $o$) to one end of the shaft $q$ upon which is mounted pulley $k^2$,— the drive-pulley $r$ corresponding to pulley $n$, being secured to the outer end of said shaft $k^2$. Pulleys $n$ $r$ may be turned by any suitable driving mechanism connected therewith.

In practice the mechanism for turning the rod $c$ and sleeve $d$ is constructed and arranged, and the various parts so timed in relation to one another, as to operate the disk $d'$ (which regulates the quantity of coal discharged) with a slow, continuous, rotary movement, or at such velocity as may be required to keep the coal in motion and properly discharge it onto the distributing blades; and to operate said blades also continuously at the proper increase in speed over the disk, to distribute the coal evenly and continuously over the whole surface as previously described.

As is well known gas producers charged by hand require fresh coal to be supplied at certain intervals,—about ten to twenty minutes,—whereas, by the application of my invention, the coal being continuously fed from a large receptacle which may be large enough to contain a car-load of coal, requires to be filled only at long intervals. It is, therefore, obvious that a large saving in labor as well as fuel is effected, and being charged at long intervals less opportunity is afforded for the escape of gas,—thus rendering the attendance upon the producer not only more comfortable, but much less injurious to the workmen.

By the use of my invention larger gas producers may be employed than when charged by hand, as the coal may be distributed equally as well over either a large or a small surface. It is also obvious that although the distributer is designed more especially for feeding the coal to gas producers, it may be used with equally as good results for feeding coal, ore or other substances required to be evenly distributed in furnaces, fire-grates and similar places.

The main or essential feature of my invention consists in combining a continuously rotating distributer run at a given speed, with a horizontal disk arranged between said distributer and the coal receptacle, run at an independent speed from the distributer. Although I prefer to combine mechanism with the distributer shaft for elevating and lowering the same as described, it not being an essential feature to the carrying out of my invention, I reserve the right to employ the same or not, as desired. If not used, the rotating disk would preferably be provided with suitable mechanism for elevating and lowering the same, to control the supply of coal from the coal receptacle to the distributer, similar to that herein shown and described for elevating and lowering said distributer. As said modified construction will be readily understood from the above description, it is deemed unnecessary to illustrate the same.

I am aware that it is not broadly new to distribute or spread the coal in a furnace by means of mechanical appliances, and I therefore limit my invention to substantially the construction herein set forth.

Having now described my invention, what I claim therein as new, and desire to secure by Letters Patent, is—

1. A gas producer or similar apparatus, in combination with an automatic distributing device comprising the following elements; a receptacle or hopper arranged over the producer and having suitable supply and discharge openings, a rotating distributer arranged in the upper part of the combustion chamber, means for turning, and elevating and lowering said distributer; a horizontal, rotating disk arranged and supported between the receptacle or hopper and distributer, and means for rotating said disk independent of the distributer, substantially as and for the purpose set forth.

2. In a feed-device for gas producers or similar apparatuses, a rotating distributer arranged under the hopper or receptacle and above the bed upon which the deposit is made; said hopper or receptacle, and means for rotating said distributer, in combination with a horizontal, rotating disk arranged between the receptacle and distributer, and means for rotating the same independent of said distributer, substantially as and for the purpose set forth.

3. The combination with a gas producer, of a coal distributing device, consisting of a coal receptacle or hopper secured in position over said producer and having suitable supply and discharge openings; the coal distributing blades E E' secured to the lower end of a vertical shaft c in the combustion chamber of the producer,—one blade flaring outward and the other converging inward as described; said shaft c and means for rotating, elevating and lowering the same; the horizontal disk d' arranged between the distributing blades and the bottom of the coal receptacle or hopper and secured to the lower end of sleeve d, and said sleeve fitted over shaft c and having means for rotating the same independent of the shaft, substantially as set forth.

CARL WILHELM BILDT.

Witnesses:
A. A. BARKER,
W. B. NOURSE.